US012542697B2

(12) United States Patent
Massoli et al.

(10) Patent No.: US 12,542,697 B2
(45) Date of Patent: Feb. 3, 2026

(54) MACHINE LEARNING FOR WIRELESS CHANNEL ESTIMATION

(71) Applicant: QUALCOMM Incorporated, San Diego, CA (US)

(72) Inventors: Fabio Valerio Massoli, Amsterdam (NL); Arash Behboodi, Amsterdam (NL); Hamed Pezeshki, San Diego, CA (US); Joseph Binamira Soriaga, San Diego, CA (US); Taesang Yoo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/158,885

(22) Filed: Jan. 24, 2023

(65) Prior Publication Data

US 2023/0362038 A1 Nov. 9, 2023

Related U.S. Application Data

(60) Provisional application No. 63/364,325, filed on May 6, 2022.

(51) Int. Cl.
*H04L 25/02* (2006.01)
*G06N 20/00* (2019.01)

(52) U.S. Cl.
CPC .......... *H04L 25/024* (2013.01); *G06N 20/00* (2019.01)

(58) Field of Classification Search
CPC .............................. H04L 25/024; G06N 20/00
See application file for complete search history.

(56) References Cited

U.S. PATENT DOCUMENTS

| 11,334,807 B1* | 5/2022 | O'Shea | G06N 3/02 |
| 2023/0318673 A1* | 10/2023 | Pezeshki | G01S 1/08 |
| | | | 375/262 |

OTHER PUBLICATIONS

Daubechies I., et al., "An Iterative Thresholding Algorithm for Linear Inverse Problems with a Sparsity Constraint", Communications on Pure and Applied Mathematics, A Journal Issued by the Courant Institute of Mathematical Sciences, vol. 57, No. 11, Nov. 2004, pp. 1413-1457.
Gregor K., et al., "Learning Fast Approximations of Sparse Coding", Proceedings of the 27th International Conference on Machine Learning, Aug. 2010, 8 pages.
Javier R.F., et al., "Frequency-Domain Compressive Channel Estimation for Frequency-Selective Hybrid mmWave MIMO Systems", IEEE Transactions on Wireless Communications, vol. 17, No. 5, May 2018, pp. 1-15.

(Continued)

*Primary Examiner* — Duc C Ho
(74) *Attorney, Agent, or Firm* — Patterson & Sheridan, L.L.P/Qualcomm Incorporated

(57) ABSTRACT

Certain aspects of the present disclosure provide techniques and apparatus for wireless channel estimation using machine learning. A sensing matrix is processed using a set of one or more layers of a machine learning model, based on a learned sparsifying dictionary, to generate a set of associated sparse vector representations. A channel estimation is determined based on output of a final layer of the set of one or more layers of the machine learning model.

30 Claims, 8 Drawing Sheets

(56) References Cited

OTHER PUBLICATIONS

Aygul M.A., et al., "Sparsifying Dictionary Learning for Beamspace Channel Representation and Estimation in Millimeter-Wave Massive MIMO", arxiv.org, Cornell University Library, 201 Olin Library Cornell University, Ithaca, NY, 14853, Apr. 28, 2022 (Apr. 28, 2022), 12 Pages, XP091189542, abstract, p. 1-p. 3, p. 4, right-hand column paragraph, section D, p. 6, left-hand column paragraph, section c—p. 8, left-hand column figures 2, 7-9.

International Search Report and Written Opinion—PCT/US2023/062935—ISA/EPO—May 26, 2023.

Pezeshki H., et al., "Beyond Codebook-Based Analog Beamforming at mmWave: Compressed Sensing and Machine Learning Methods", arxiv.org, Cornell University Library, 201 Olin Library Cornell University, Ithaca, NY, 14853, Nov. 3, 2022 (Nov. 3, 2022), 6 Pages, XP091360083, the whole document.

Zhang X., et al., "Near-Field Channel Estimation for Extremely Large-Scale Array Communications: A Model-Based Deep Learning Approach", arxiv.org, Cornell University Library, 201 Olin Library Cornell University, Ithaca, NY, 14853, Nov. 28, 2022 (Nov. 28, 2022), 6 Pages, XP091380666, the whole document.

\* cited by examiner

MACHINE LEARNING FOR WIRELESS CHANNEL ESTIMATION

CROSS-REFERENCE TO RELATED APPLICATIONS

This application claims benefit of and priority to U.S. Provisional Patent Application Ser. No. 63/364,325, filed May 6, 2022, the entire contents of which are incorporated herein by reference.

INTRODUCTION

Aspects of the present disclosure relate to machine learning for wireless channel estimation.

Wireless communication channels can have a variety of dynamic properties that affect how a wireless signal propagates from a transmitter to a receiver. Such properties are often referred to collectively as channel state information (CSI); determining or estimating such properties may be referred to as channel estimation. Accurate channel estimation allows for adapting the wireless transmission based on channel conditions, which can significantly improve communication reliability and throughput, particularly when multiple antennas are used, such as in multiple-input multiple-output (MIMO) systems. However, channel estimation is an underdetermined problem (e.g., a problem where there are enough unknowns such that one cannot conclusively determine values for all of the problem parameters) in many deployments (such as millimeter-wave (mmWave) massive MIMO systems that use analog beamforming). As a result, channel estimations are often inaccurate or computationally expensive to perform or are simply unavailable.

BRIEF SUMMARY

Certain aspects provide a processor-implemented method for performing channel estimation of a digital communication channel using a machine learning model, comprising: processing a sensing matrix using a set of one or more layers of the machine learning model, based on a learned sparsifying dictionary; and determining a channel estimation based on output of a final layer of the set of one or more layers of the machine learning model.

Certain aspects provide a processor-implemented method for training a machine learning model for channel estimation of a digital communication channel, comprising: processing a sensing matrix using a set of one or more layers of the machine learning model, based on a learned sparsifying dictionary; determining a channel estimation based on output of a final layer of the set of one or more layers of the machine learning model; and refining the learned sparsifying dictionary based on the channel estimation and a ground-truth channel state of the digital communication channel.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain example aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
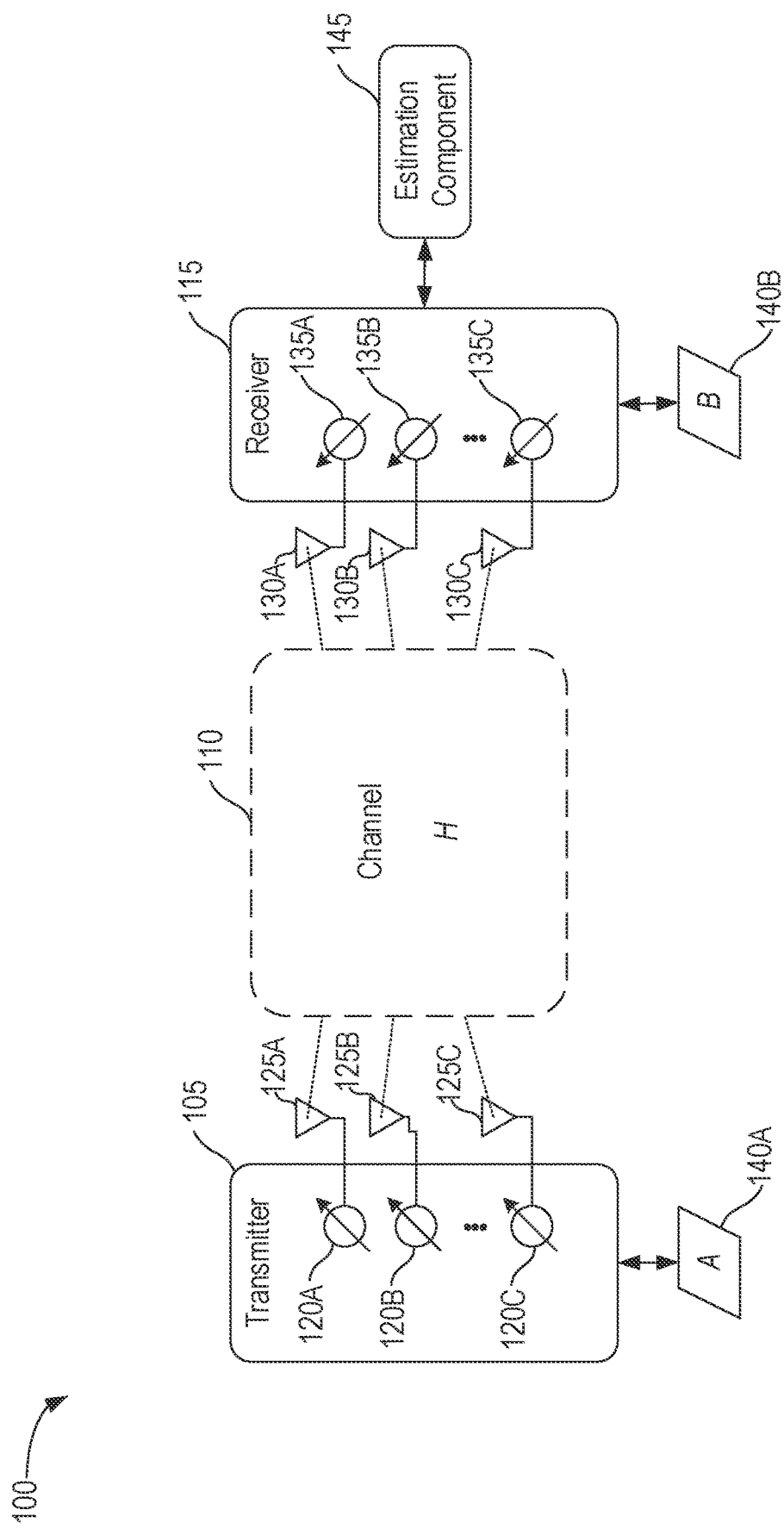
FIG. 1 depicts an example environment for improved channel estimation using machine learning.

Aspects of the present disclosure provide apparatuses, methods, processing systems, and non-transitory computer-readable mediums for machine-learning-based channel estimation.

Channel estimation can be a significant problem in a variety of wireless communication systems, and particularly in MIMO wireless systems. Although some examples described in the present disclosure involve using machine learning to improve channel estimations in mmWave (e.g., communications in frequency bands above 24 GHz, where the wavelength is on the order of millimeters) systems, beamforming systems, and/or MIMO systems, aspects of the present disclosure are readily applicable to any estimation problem with underdetermined measurements.

A variety of compressed sensing techniques have been used in the context of mmWave and massive MIMO channel estimation, but the channel estimation problem remains an underdetermined problem. For example, in systems using analog beamforming, the channel observations are generally a lower dimensionality representation of a relatively higher-dimension channel. To provide improved estimations, some compressed sensing techniques attempt to leverage sparsity of the channel in the angular domain (rather than an antenna-focused domain). That is, the channel may be relatively dense in the antenna or spatial domain (e.g., with most elements having similar values and with little or no structure). In the angular domain, however, the channel is generally sparse (with most elements having a low or null value) and structured (with few elements having significant values). For example, the outer product of antenna responses on the transmit side and the receive side may be used as atoms or elements of the sparsifying dictionary that can be used to provide compressed sensing and channel estimations. In some aspects, the channel can be represented as the product between a sparsifying dictionary $\Psi$ and a sparse vector representation of the signal, where the sparsifying dictionary corresponds to the angular domain of the transmitter and receiver. In some aspects of the present disclosure, the sparsifying dictionary can be learned during training based on observed channel information and corresponding sensing matrices $\Phi$ (which may correspond to the beamforming matrices or codebooks used to transmit/receive the signal, as discussed in more detail below).

Generally, conventional approaches for solving this compressed sensing problem involve a number of complications or tradeoffs, such as iterative methods like orthogonal matching pursuit (OMP) techniques, iterative hard-thresholding algorithm (IHTA) based techniques, iterative soft-thresholding algorithm (ISTA) techniques, and approximate message-passing (AMP) techniques. The hyperparameters of such algorithms (e.g., the number of iterations and the thresholds) can be manually tuned to attempt to optimize the performance/complexity trade-off, but conventional approaches generally remain significantly limited in their flexibility and accuracy.

Some machine learning methods have been used to attempt to learn sparse recovery algorithms from sample data. For example, methods like learned ISTA (LISTA) and variations have focused on solving the problem using fixed sensing matrices (also referred to as measurement matrices) and sparsifying dictionaries. That is, such conventional approaches use static sparsifying dictionaries and static sensing matrices, whereas realistic deployments are generally significantly more dynamic. Use of such fixed approaches results in inherently limited estimations, preventing accurate and reliable channel estimations in a wide variety of realistic deployments.

In aspects of the present disclosure, techniques are provided to consider the channel in its full generality (e.g., with planar dual polarization antenna arrays in three-dimensional space). However, the dimensionality of such problems expands rapidly in these deployments, which makes the sparse recovery problem significantly more complex. In some aspects, to reduce or handle such complexity, a dictionary-LISTA (D-LISTA) approach is introduced. In some aspects, the D-LISTA architecture can be implemented as an unrolled version of ISTA, using one or more neural networks to perform the processing operations. The D-LISTA architecture disclosed herein can jointly learn both the sparsifying dictionary and the reconstruction algorithm(s), and can considerably reduce the number of iterations used (e.g., the number of layers of the neural network model), as well as reduce the dictionary dimensionality. For example, in given environments there are generally correlations between different channel clusters, such that the sparse angular domain representation has additional structure that can be captured by the dictionary learning techniques described herein. Additionally, the joint learning of the dictionary and other parameters contributes to faster convergence, enabling a reduced number of layers/iterations. This substantially reduces the computational complexity of the model, thereby reducing both training time and inference time and reducing power consumption. Additionally, such improvements make it practical to use the trained model on low power devices (e.g., mobile devices).

Additionally, in contrast to conventional techniques relying on a fixed sensing matrix and/or pre-computed sparsifying dictionary, aspects of the present disclosure can enable use of variable or dynamic sensing matrices and learned dictionaries, which can significantly improve the accuracy and performance of the models and better represent realistic systems.

Example Environment for Channel Estimation Using Machine Learning

FIG. 1 depicts an example environment 100 for improved channel estimation using machine learning. In the illustrated example, the environment 100 is a MIMO system using analog beamforming to provide wireless communications. In at least one aspect, the environment 100 corresponds to a mmWave MIMO system.

As illustrated, the environment 100 includes a transmitter 105 and a receiver 115 communicating via a channel 110. In the depicted example, the transmitter 105 uses a set of transmitting antennas 125A-125C, while the receiver 115 uses a set of receiving antennas 130A-130C. Although three antennas are depicted on each system, the transmitter 105 and receiver 115 can generally use any number of antennas. Additionally, although the illustrated example depicts a single transmitter 105 and receiver 115, in some aspects, each device may operate as both a transmitter and receiver (e.g., a transceiver). Further, though not included in the illustrated example, in some aspects, some or all of the antennas of the transmitter 105 and/or receiver 115 may be arranged into one or more discrete subarrays. In at least one aspect, the transmitter 105 corresponds to a wireless base station, such as a 5G radio base station (e.g., a gNodeB), while the receiver 115 corresponds to user equipment.

In some aspects, the transmitter 105 (acting as a base station or BS) can wirelessly communicate with (e.g., transmit signals to or receive signals from) user equipment (UEs) such as receiver 115 via communications links (e.g., via channel 110). The communications links between BSs and UEs may include uplink (UL) (also referred to as reverse link) transmissions from a UE to a BS and/or downlink (DL) (also referred to as forward link) transmissions from a BS to a UE. The communications links may use multiple-input and multiple-output (MIMO) antenna technology, including spatial multiplexing, beamforming, and/or transmit diversity in various aspects.

BSs (such as the transmitter 105) may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each BS may provide communications coverage for a respective geographic coverage area, which may sometimes be referred to as a cell, and which may overlap in some cases (e.g., a small cell may have a coverage area that overlaps the coverage area of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home), and/or other types of cells.

In some aspects, the receiver 115 is part of a UE. In aspects, UEs may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/ actuator, display, internet of things (IoT) devices, always on (AON) devices, edge processing devices, or other similar devices. UEs may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

In the depicted environment 100, the transmitter 105 and receiver 115 each respectively use a set of phase shifters 120 (e.g., 120A-120C) and 135 (e.g., 135A-135C) to provide analog beamforming according to beamforming codebooks 140A and 140B. Specifically, each transmitting antenna 125 of the transmitter 105 has a corresponding phase shifter 120, and each receiving antenna 130 of the receiver 115 has a corresponding phase shifter 135. As discussed above, the use of multiple antennas on each side of the transmission (e.g., the fact that the environment 100 depicts a MIMO system) and the use of analog beamforming (using phase shifters 120 and 135) significantly increases the complexity of performing channel estimation.

The channel 110 generally represents the wireless medium through which the signal propagates from the transmitter 105 to the receiver 115. The properties of the channel 110 can significantly affect how the signal propagates. As such, channel estimation using machine learning may be used to determine, predict, or infer the state of the channel 110. In some aspects, the signal observed by the receiver 115 may be formulated as Y=AHB, where Y is the observed signal (also referred to as a channel observation in some aspects), A and B are analog beamforming codebooks 140A and 140B (also referred to as beamforming matrices) used by the transmitter 105 and receiver 115, respectively (which may be proprietary and/or changing over time), and H represents the channel 110. In one such formulation, the goal of channel estimation is to estimate or predict H based on the channel observation Y.

In the illustrated example, an estimation component 145 is communicably coupled with the receiver 115. Although depicted as a discrete component for conceptual clarity, in some aspects, the estimation component 145 is integrated into the receiver 115. In some aspects, the estimation component may use machine learning to provide channel estimations for the channel 110, for example as discussed in more detail below. Additionally, though depicted as coupled with the receiver 115, in some aspects, the estimation component 145 may be integrated with or coupled to other components, such as the transmitter 105.

In some conventional systems, the channel estimation is determined based on various data including the element response matrices of the receiver 115 and transmitter 105 computed at two-dimensional angular grid points, where the response matrices can be used to define the sparsifying dictionary that is used to reconstruct the channel. That is, conventional approaches generally require knowledge of the response matrices (e.g., the antenna element response at any given direction) to define a fixed and static sparsifying dictionary. In contrast, aspects of the present disclosure enable the sparsifying dictionary to be learned during training, as discussed in more detail below. Additionally, as discussed above, conventional systems generally require use of a fixed measurement or sensing matrix, while aspects of the present disclosure enable varying sensing matrices.

In some aspects, the use of a varying sensing matrix may be especially useful in the context of MIMO systems and beamforming systems. As aspects of the present disclosure do not require a priori knowledge about the sparsifying set of basis vectors for the signal to be recovered, nor do aspects of the present disclosure require the sparsifying dictionary to be fixed, the techniques described herein can significantly improve model performance and accuracy. In some aspects, the channel 110 is estimated by learning a sparsifying dictionary beginning from a randomized basis, rather than from a computed dictionary. In some aspects, the training system can additionally or alternatively receive a pre-computed sparsifying dictionary and refine or fine-tune the sparsifying dictionary during the training process.

Once the model(s) are trained (e.g., as discussed below with reference to FIG. 2), the model can be used to generate channel estimations that can drive a variety of further operations to improve the functionality of the network/ environment 100. For example, by estimating the channel 110, the estimation component 145 (or any inferencing system) can enable improved analog beamforming design, faster beam selection, improved spectral efficiency prediction, sensing or positioning (e.g., locating objects in the space), link adaptation, communication parameter selection, and the like. For example, the estimated channel can be used to design the beamforming codebooks used by the transmitter and/or receiver to achieve better end-to-end performance.

Example Workflow to Train Machine Learning Models for Channel Estimation

Figure 2:
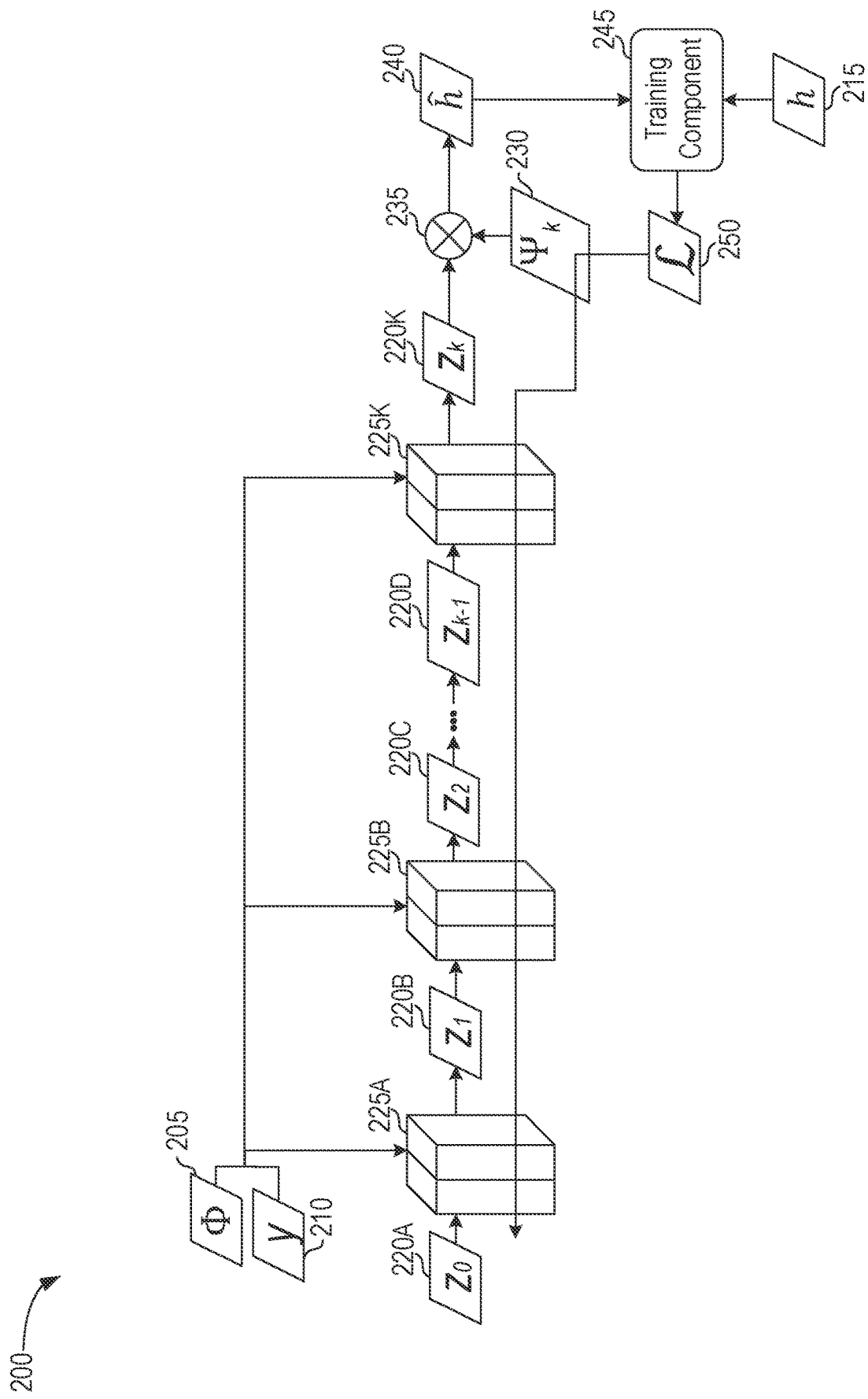
FIG. 2 depicts an example workflow to train machine learning models to perform improved channel estimation.

FIG. 2 depicts an example workflow 200 to train machine learning models to perform improved channel estimation. In some aspects, the workflow 200 is used to provide offline training of machine learning models. The training can generally be performed by any suitable device or system, such as dedicated training systems. In at least one aspect, the workflow 200 is performed by an estimation component, such as estimation component 145 of FIG. 1.

The workflow 200 generally uses a supervised training approach to refine the parameters of the model based on training exemplars, where each exemplar includes a channel observation y (denoted by 210 in the illustrated example), a corresponding sensing matrix Φ (denoted by 205 in the illustrated example), and a ground-truth or known channel state h (denoted by 215 in the illustrated example). Generally, the channel observation 210 corresponds to the signal observed at a receiver (e.g., receiver 115 of FIG. 1). The sensing matrix 205 is a function of the beamforming matrices (which are often proprietary designs and are generally known to the receiver and transmitter devices) used for the measurement or signal observation. In some aspects, the sensing matrix 205 is the Kronecker product of the two beamforming codebooks (such as the beamforming codebooks 140A and 140B of FIG. 1). For example, in at least one aspect, the sensing matrix 205 is defined as $B^T \otimes A$, where $B^T$ is the transpose of matrix B (which may correspond to the beamforming codebook of the receiver used to observe the observation 210, as discussed above) and A is the beamforming codebook of the transmitter used to generate the transmission.

Further, in at least one aspect, the sensing matrix 205 can additionally be parameterized and learnable (alongside the sparsifying dictionary). By learning the sensing matrix 205, the training system may thereby learn new beamforming matrices for the receiver and transmitter (thereby improving communications).

As discussed above, in contrast to at least some conventional approaches, the workflow 200 enables the sensing matrix 205 to differ or vary. That is, each observation 210 may have a corresponding sensing matrix 205, rather than using a fixed sensing matrix for all samples. This can improve the flexibility and accuracy of the model, as compared to at least some conventional approaches.

In the illustrated aspect, the machine learning architecture includes a set of one or more blocks 225A, 225B, and 225K. Although three blocks are depicted, in aspects, the number of blocks (also referred to as the number of layers in the model and/or the number of iterations of the model) may differ. In at least one aspect, each block 225 corresponds to a layer of a neural network model. In some aspects, a single layer or block 225 is used. In at least one aspect, a single layer can be re-used (iteratively) multiple times, effectively serving as a sequence of layers/blocks. The training workflow 200 generally includes learning a parameterized function map $f_\Theta$ that, given an observation 210 and sensing matrix 205 (e.g., $y_i$, $\Phi_i$ for the i-th data sample), predicts the sparse representation for the signal. This sparse representation is indicated in blocks 220A-K, and is refined or updated as the data passes through each block 225 of the model.

At the output of the model, the final sparse representation 220K is combined with a learned sparsifying dictionary 230 (e.g., by multiplication operation 235) to generate a channel estimation 240 (denoted as $\hat{h}$). This estimation 240 can then be compared against the known channel state 215 (denoted as h) to generate a loss 250 (denoted as $\mathcal{L}$), which is then used to refine the model parameters.

In some aspects, the model uses a set of learnable parameters $\Theta=\{\gamma, \theta, \Psi\}$, where $\gamma$ is a learned step size used by the model, $\theta$ is a learned threshold used by the model, and $\Psi$ is a sparsifying dictionary used by the model, each of which is discussed in more detail below. In at least one aspect, each iteration or block 225 of the model uses a shared value for the trainable parameters. That is, the step size $\gamma$, threshold $\theta$, and sparsifying dictionary $\Psi$ may be learned and used across all blocks. In some aspects, each block 225 uses a separate value for each trainable parameter. That is, for each given iteration or block 225, the training system may learn a respective step size, a respective threshold, and a respective sparsifying dictionary.

In the illustrated workflow 200, each block 225A-K receives a sparse vector representation of the wireless signal (indicated by blocks 220A-220K) and outputs an updated value or version of the sparse representation. Specifically, block 225A receives sparse representation 220A and outputs sparse representation 220B, block 225B receives sparse representation 220B and outputs sparse representation 220C, and so on. As illustrated, each block 225 computes the updated sparse representation 220 further using the channel observation 210 and sensing matrix 205.

In some aspects, the sparse representation 220 output by a given block 225 with index k based on an input exemplar i (having observation $y_j$ and sensing matrix $\Phi_i$) is defined using Equation 1 below, where $z_i^{k+1}$ is the sparse representation output by the layer k based on input sample i, $z_i^k$ is the sparse representation that is input to the layer k based on sample i, $\eta_{\theta^k}$ is a soft thresholding function for layer k where $\theta$ is a learned threshold (which may be unique to the layer k, or may be shared across layers) and g is an update value computed using Equation 2 below. In some aspects, the soft threshold operation sets values within the range defined by $\theta$ to zero (e.g., values between $-|\theta|$ and $|\theta|$), while values outside of this range are passed through unchanged or scaled. In one aspect, the sparse representation output by the layer k, $z_i^{k+1}$, may be represented as:

$$z_i^{k+1}=\eta_{\theta^k}(z_i^k+g) \qquad (1)$$

For example, for the block 225B, the output sparse representation 220C is generated by summing the input sparse representation 220B and an update value, and applying a thresholding operation using threshold $\theta$. In some aspects, the update value g may be defined using Equation 2 below, where $\gamma^k$ is the learned step size of the layer k (which may be unique to the layer k, or may be shared value across layers), $\Phi_i$ is the sensing matrix of the input sample i (e.g., the sensing matrix 205 that corresponds to the observation 210), $\Psi^k$ is the learned sparsifying dictionary used by the layer k (which may be unique to the layer k, or may be shared across layers), and r is a residual value.

$$g=\gamma^k(\Phi_i\Psi^k)^T \cdot r \qquad (2)$$

In some aspects, the residual value r is defined using Equation 3 below, where $y_i$ is the channel observation 210 for sample i, $\Phi_i$ is the sensing matrix of the input sample i (e.g., the sensing matrix 205 that corresponds to the observation 210), $\Psi^k$ is the learned sparsifying dictionary used by the layer k (which may be unique to the layer k, or may be shared across layers), and $z_i^k$ is the sparse representation input to the layer k based on sample i.

$$r=y_i-\Phi_i\Psi^k z_i^k \qquad (3)$$

For example, for block 225B, the residual value is generated by multiplying the sensing matrix 205 with the learned sparsifying dictionary of the block 225B and the input sparse representation 220B, and then subtracting this value from the channel observation 210.

In some aspects, the first sparse representation 220A (used as input to the first block 225A of the model) can be instantiated in a variety of ways, such as using a predefined value. For example, in at least one aspect, the first sparse representation 220A is generated by initializing a vector with a value of zero (e.g., where all elements of the vector are zero). In some aspects, the initial sparse representation 220A can be initiated using random or pseudo-random values.

In the illustrated workflow 200, therefore, the input sensing matrix 205 and channel observation 210 are provided to each block 225A-K of the model, which use these values and a respective input sparse representation 220A-D to compute a respective updated or output sparse representation 220B-K (e.g., using Equations 1, 2, and 3 above). At the output of the final block 225K (which may, in some aspects, be the first and only layer of the model), the sparse representation 220K is multiplied with a learned sparsifying dictionary 230 to generate the channel estimation 240. In some aspects, if a single sparsifying dictionary is shared across the blocks 225, this shared dictionary may be used as the sparsifying dictionary 230. In some aspects, if each layer learns its own respective dictionary, the sparsifying dictionary 230 can similarly be learned as a discrete dictionary during training.

As illustrated, the channel estimation 240 (generated based on the channel observation 210 and the sensing matrix 205) is then evaluated by a training component 245, alongside the ground-truth channel 215, to generate a loss 250. For example, in at least one aspect, the training component 245 computes the mean squared error and/or normalized mean squared error between the channel estimation 240 and channel 215. As illustrated, this loss 250 can then be backpropagated through the model (including the sparsifying dictionary 230, if a separate dictionary is used, and each block 225A-K) to refine the parameters of the model (e.g., to refine the step size, sparsifying dictionary, and threshold values used by each layer). In some aspects, rather than training the step size parameter(s), these values can remain fixed. This can improve training stability for some datasets, easing convergence of the model.

In aspects, the trained parameters of the model can be initialized (e.g., at the beginning of training) in a variety of ways. For example, in at least one aspect, the parameters (e.g., step size(s), sparsifying dictionary or dictionaries, and/or threshold(s)) can be initialized randomly or pseudo-randomly. In at least one aspect, the sparsifying dictionary (or dictionaries) can alternatively be instantiated using one or more other techniques, such as by applying sparse principal component analysis (SPCA) to some or all of the training dataset. The values of the dictionary (and other parameters) can then be refined or fine-tuned during training.

In some aspects, as discussed above, the training system can learn the sparsifying dictionary $\Psi$ in its entirety. In at least one aspect, the training system may determine a component or subset of the sparsifying dictionary from other sources, and learn the remaining portions. For example, in some such aspects, the training system can receive the sparsifying dictionary used by the transmitting device for the communication. As the overall sparsifying dictionary $\Psi$ may be the Kronecker product of the receiver dictionary and transmitter dictionary, in some aspects, the system can use the (known) transmitter dictionary to optimize learning of the overall sparsifying dictionary $\Psi$ (e.g., to learn only the receiver-side dictionary). Similarly, in some aspects, the training system may receive the receiver dictionary, and learn only the transmitter-side sparsifying dictionary.

In the illustrated example, the training system processes the entire channel observation 210 and sensing matrix 205 to refine the model. For example, the channel observation 210 may be a vector having 128 elements, while the sensing matrix is a matrix with 128 rows and 128 columns. However, in some aspects, acquiring and/or processing such voluminous data may be unrealistic (e.g., because capturing and/or processing the data would cause significant power consumption, which is often limited on certain types of receiving devices, such as mobile and other lower power user equipment). In some aspects, therefore, although a large number of measurements (e.g., 128) may be available in the observation 210, the training system can use a subset of these values when training the model. In some aspects, the training system may use N values (e.g., N=5 values) having the highest reference signal received power (RSRP), received signal quality indicator (RSQI), and/or received signal strength indicator (RSSI) in the channel observation 210. For example, the training system may use only the first five values or rows in the observation 210 (and the corresponding values or rows in the sensing matrix) to train the model. As a result, the (subset of the) sensing matrix may be an underdetermined system having more columns (e.g., 128 columns) than rows (e.g., 5 rows), enabling the channel estimation problem to be effectively cast as a sparse recovery problem that is efficiently solved using the models described herein.

Once a given input sample (including a sensing matrix 205, observation 210, and channel 215) has been used to refine the model, subsequent samples may similarly be used to generate corresponding channel estimations 240 and losses 250. In aspects, this training workflow 200 can be performed using stochastic gradient descent (e.g., back-propagating each loss 250 for each input sample individually) and/or batch gradient descent (e.g., refining the model based on loss 250 generated for a batch of input samples).

Once training is complete, the model architecture can be used to generate channel estimations during runtime inferencing based on input observations 210 and sensing matrices 205, as discussed in more detail below.

Example Workflow for Channel Estimation Using Machine Learning Models

Figure 3:
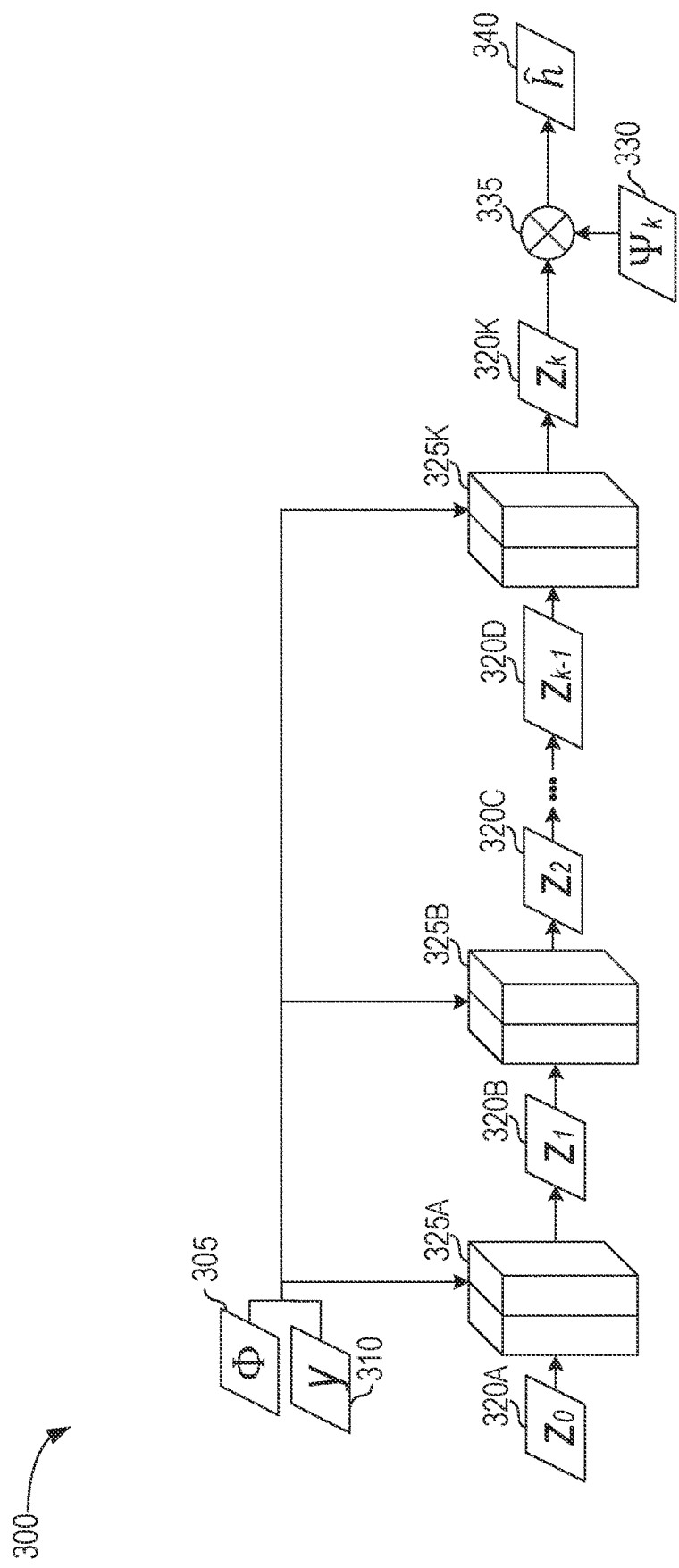
FIG. 3 depicts an example workflow to perform channel estimation using trained machine learning models.

FIG. 3 depicts an example workflow 300 to perform channel estimation using trained machine learning models. In some aspects, the workflow 300 is used to provide online inferencing using machine learning models by an inferencing system. In at least one aspect, the workflow 300 is performed by user equipment participating in the wireless communication (e.g., by the receiver 115 of FIG. 1 and/or by a device or system that includes or uses the receiver). In at least one aspect, the workflow 300 is performed by an estimation component, such as estimation component 145 of FIG. 1.

The workflow 300 generally uses a trained machine learning model (e.g., trained using the workflow 200 of FIG. 2) to generate a channel estimation 340 based on input data (including a channel observation 310 and a corresponding sensing matrix 305). As discussed above, the channel observation 310 generally corresponds to the signal perceived by a receiver (e.g., the receiver 115 of FIG. 1), and the sensing matrix 305 is generally defined based on the beamforming codebooks used by the transmitter and receiver when the signal was observed.

As discussed above with reference to FIG. 2, the model can process the observation 310 and sensing matrix 305 to generate a sparse representation 320K of the wireless signal, and use this representation in conjunction with a learned sparsifying dictionary 330 to generate the channel estimation 340 (e.g., via multiplication operation 335).

As discussed above, in contrast to at least some conventional approaches, the workflow 300 enables the sensing matrix 305 to differ or vary. That is, each observation 310 may have a corresponding sensing matrix 305, rather than using a fixed sensing matrix for all samples. In the illustrated aspect, the machine learning architecture includes a set of one or more blocks 325A, 325B, and 325K for processing the data. As discussed above, each block 325 may be a layer of a neural network. Although three blocks are depicted, in aspects, the number of blocks (also referred to as the number of layers in the model and/or the number of iterations of the model) may differ. For example, in some aspects, a single block 325 is used, and in other aspects, additional layers are used.

As illustrated, the inferencing system can first generate, initialize, or instantiate a vector for an initial sparse representation 320A (e.g., randomly or using a defined fixed value such as zero), and provide this sparse representation 320A as input, alongside the observation 310 and sensing matrix 305, to the first block 325A of the network. The block 325A may process these data as discussed above based at least in part on a set of learned parameters (e.g., a learned step size, a learned sparsifying dictionary, and/or a learned threshold value). In some aspects, each block 325 has a corresponding set of learned parameters. That is, the learned parameters may be specific to each block 325. In other aspects, some or all of the learned parameters may be shared across the blocks 325.

As a result of the processing, the block 325A outputs an updated sparse representation 320B (e.g., using Equations 1, 2, and 3). For example, as discussed above, the block 325A may determine a residual value based on the observation 310, the sensing matrix 305, a learned sparsifying dictionary, and the sparse vector representation (e.g., using Equation 3 above). Similarly, the block 325A may use the residual value, the sensing matrix 305, the learned sparsifying dictionary, and the step size (which may be learned or may be fixed, as discussed above) to generate an update value (e.g., using Equation 2 above). The block 325A can then generate the updated sparse representation 320B based on the update value and the input sparse representation 320A, which may include using a thresholding operation with a learned threshold (e.g., using Equation 1 above).

As illustrated, this process of updating the sparse representation 320 can be iteratively performed by one or more blocks 325 until the final output representation 320K is generated. As illustrated, by multiplying this sparse representation 320K with the learned sparsifying dictionary 330, the channel estimation 340 is generated. As discussed above, the learned sparsifying dictionary 330 may be shared across the layers or blocks 325 of the model (e.g., where each block 325 uses the same shared sparsifying dictionary 330), or may be a separate dictionary learned alongside the rest of the model during training.

As discussed above, this channel estimation 340 can then be used for a variety of purposes, such as improving the analog beamforming, beam selection, spectral efficiency prediction, and the like.

Example Method for Training Machine Learning Models for Channel Estimation

Figure 4:
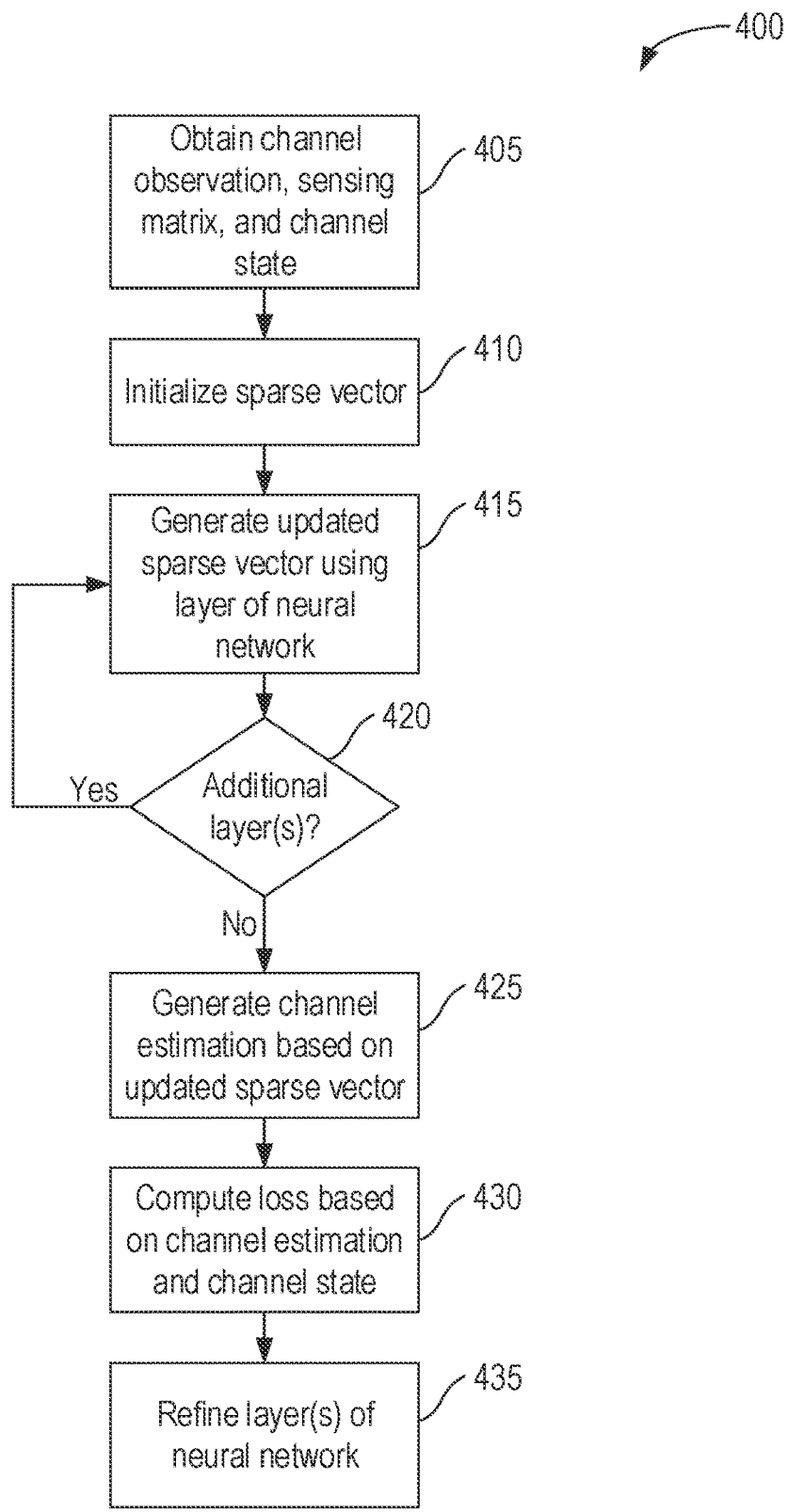
FIG. 4 is a flow diagram depicting an example method for training machine learning models for channel estimation.

FIG. 4 is a flow diagram depicting an example method 400 for training machine learning models for channel estimation. In some aspects, the method 400 provides additional detail for the workflow 200 of FIG. 2. In some aspects, the method 400 is performed to provide offline training of one or more machine learning models, such as by a training device or system.

At block 405, the training system obtains, determines, identifies, receives, or otherwise accesses a training sample including a channel observation (e.g., observation 210 of FIG. 2), a sensing matrix (e.g., sensing matrix 205 of FIG. 2), and a channel state (e.g., channel 215 of FIG. 2). In some aspects, as discussed above, the channel observation corresponds to a wireless signal as observed or measured by a receiving device or system, the sensing matrix is defined based on the parameters used to transmit and/or receive the signal (e.g., the beamforming codebooks used by the transmitter and receiver), and the channel state corresponds to the properties of the wireless medium when the signal was transmitted.

In some aspects, the channel observation, sensing matrix, and channel state may generally be determined or received as part of a training sample or exemplar, as discussed above. By using such samples, the training system can iteratively refine the machine learning model to generate improved sparse representations of the wireless signal when provided new channel observations and sensing matrices. As discussed above, these sparse representations can in turn be used (alongside a learned sparsifying dictionary) to generate accurate channel estimations.

At block 410, the training system initializes a sparse vector representation of the signal. For example, as discussed above, the training system can initialize this first representation with a value of zero (e.g., where all elements of the vector are zero). This may correspond, for example, to the sparse representation 220A of FIG. 2.

At block 415, the training system generates an updated sparse vector (e.g., sparse representation 220B of FIG. 2) using a layer (e.g., the first layer) of a neural network model.

For example, as discussed above, the training system can process the initial or current sparse vector (initialized in block 410), the channel observation, and the sensing matrix in order to generate an updated sparse vector representation. In some aspects, this includes processing the data using trained parameters (e.g., a trained step size, a trained sparsifying dictionary, and/or a trained threshold), which may be unique to the current layer of the network or may be shared across layers. In at least one aspect, the training system can use Equations 1, 2, and 3, discussed in detail above, to generate the updated sparse vector. One example technique for performing block 415 is described in more detail below with reference to FIG. 6.

At block 420, the training system determines whether there is at least one additional layer remaining in the model. That is, the training system can determine whether the layer processed at block 415 was the last or final layer. If there is at least one additional layer remaining, the method 400 returns to block 415, where the training system can generate a new updated sparse vector by processing the current vector (which was generated at block 415 using the prior/initial sparse vector) using the next layer of the model. In this way, the method 400 can proceed to process data through each layer of the model, iteratively refining or updating the sparse vector representation as the sparse vector representation passes through each layer.

If no further layers remain, the method 400 continues to block 425. At block 425, the training system generates a channel estimation (e.g., channel estimation 240 of FIG. 2) based on the most recent or current updated sparse channel representation that was generated by the final layer of the model (e.g., sparse representation 220K of FIG. 2). For example, as discussed above, the training system may multiply the updated sparse vector with a trained sparsifying dictionary (e.g., sparsifying dictionary 230 of FIG. 2) in order to generate the channel estimation.

At block 430, the training system can then compute a loss based on the channel estimation (generated at block 425) and the known channel state (determined at block 405). For example, as discussed above, the training system may compute the normalized mean squared error between the channel estimation and channel state. Although the illustrated example depicts generating the loss based on a single training sample (e.g., a single observation with corresponding sensing matrix and channel state), in some aspects, the training system can use batch training to generate a loss based on multiple samples.

At block 435, the training system can then refine the layer(s) of the neural network model based on the loss, as discussed above. For example, the training system may use backpropagation to refine the parameters of each layer, beginning with the final layer (or beginning with the final sparsifying dictionary used to generate the channel estimation) and moving towards the first. Generally, the method 400 can be used to refine the neural network model using any number and variety of training samples.

In some aspects, as discussed above, the training system can train or refine a separate set of parameters for each layer of the model. That is, each respective layer may have a respective learned step size, learned sparsifying dictionary, and/or learned threshold value. In some such aspects, the training system can also use the loss to refine a final sparsifying dictionary used to generate the channel estimation. In some aspects, the training system may use a set of shared parameters across the layers, as discussed above.

By using the method 400, the training system can train the model to generate significantly improved channel estimations, particularly for MIMO systems and/or systems using analog beamforming. Additionally, as discussed above, the trained model can generally use sparsifying dictionaries having lower dimensionality, as compared to at least some conventional approaches, enabling the models to be used by devices or systems with more limited computational or power resources, such as user equipment.

Example Method for Channel Estimation Using Machine Learning Models

Figure 5:
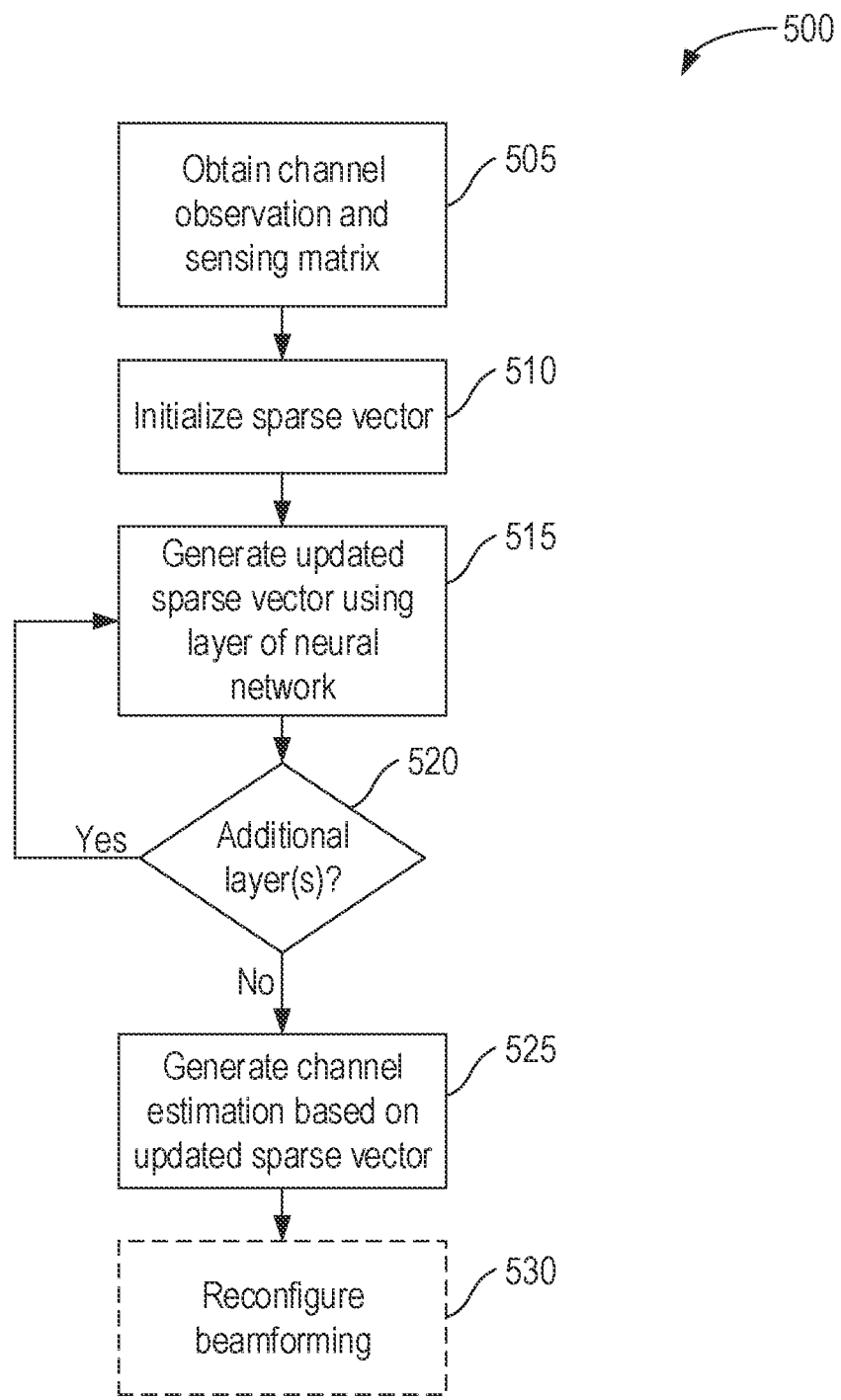
FIG. 5 is a flow diagram depicting an example method for performing channel estimation using machine learning models.

FIG. 5 is a flow diagram depicting an example method 500 for performing channel estimation using machine learning models. In some aspects, the method 500 provides additional detail for the workflow 300 of FIG. 3. In some aspects, the method 500 is performed by an inferencing device or system. In at least one aspect, the method 500 is performed by the user equipment participating in the wireless communications. In some aspects, the method 500 can additionally or alternative be performed by the base station participating in the communications.

At block 505, the inferencing system obtains, determines, identifies, receives, or otherwise accesses a data sample including a channel observation (e.g., observation 310 of FIG. 3) and a sensing matrix (e.g., sensing matrix 305 of FIG. 3). In some aspects, as discussed above, the channel observation corresponds to a wireless signal as observed or measured by a receiving device or system, and the sensing matrix is defined based on the parameters used to transmit and/or receive the signal (e.g., the beamforming codebooks used by the transmitter and receiver).

In some aspects, the channel observation and sensing matrix may generally be determined or received as part of a data sample for runtime processing, as discussed above. By evaluating such samples, the inferencing system can generate an accurate sparse representation of the wireless signal. As discussed above, this sparse representation can in turn be used (alongside a learned sparsifying dictionary included in the model) to generate accurate channel estimations.

At block 510, the inferencing system initializes a sparse vector representation of the signal. For example, as discussed above, the inferencing system can initialize this first representation with a value of zero (e.g., where all elements of the vector are zero). This may correspond, for example, to the sparse representation 320A of FIG. 3.

At block 515, the inferencing system generates an updated sparse vector (e.g., sparse representation 320B of FIG. 3) using a layer (e.g., the first layer) of a neural network model. For example, as discussed above, the inferencing system can process the initial or current sparse vector (initialized in block 510), the channel observation, and the sensing matrix in order to generate an updated sparse vector representation. In some aspects, this includes processing the data using trained parameters (e.g., a trained step size, a trained sparsifying dictionary, and/or a trained threshold), which may be unique to the current layer of the network or may be shared across layers. In at least one aspect, the inferencing system can use Equations 1, 2, and 3, discussed in detail above, to generate the updated sparse vector. One example technique for performing block 515 is described in more detail below with reference to FIG. 6.

At block 520, the inferencing system determines whether there is at least one additional layer remaining in the model. That is, the inferencing system can determine whether the layer processed at block 515 was the last or final layer. If there is at least one additional layer remaining, the method 500 returns to block 515, where the inferencing system can generate a new updated sparse vector by processing the current vector (which was generated at block 515 using the prior/initial sparse vector) using the next layer of the model. In this way, the method 500 can proceed to process data through each layer of the model, iteratively refining or updating the sparse vector representation as the sparse vector representation passes through each layer.

If no further layers remain, the method 500 continues to block 525. At block 525, the inferencing system generates a channel estimation (e.g., channel estimation 340 of FIG. 3) based on the most recent or current updated sparse channel representation that was generated by the final layer of the model (e.g., sparse representation 320K of FIG. 3). For example, as discussed above, the inferencing system may multiply the updated sparse vector with a learned sparsifying dictionary (e.g., sparsifying dictionary 330 of FIG. 3) in order to generate the channel estimation.

At block 530, the inferencing can then use the channel estimation to reconfigure, refine, or otherwise improve the wireless communications, such as by redefining the beamforming configuration. For example, as discussed above, the channel estimation can be used to inform or drive analog beamforming design, to enable faster and more accurate beam selection for the communication, and/or to provide improved spectral efficiency predictions.

Figure 6:
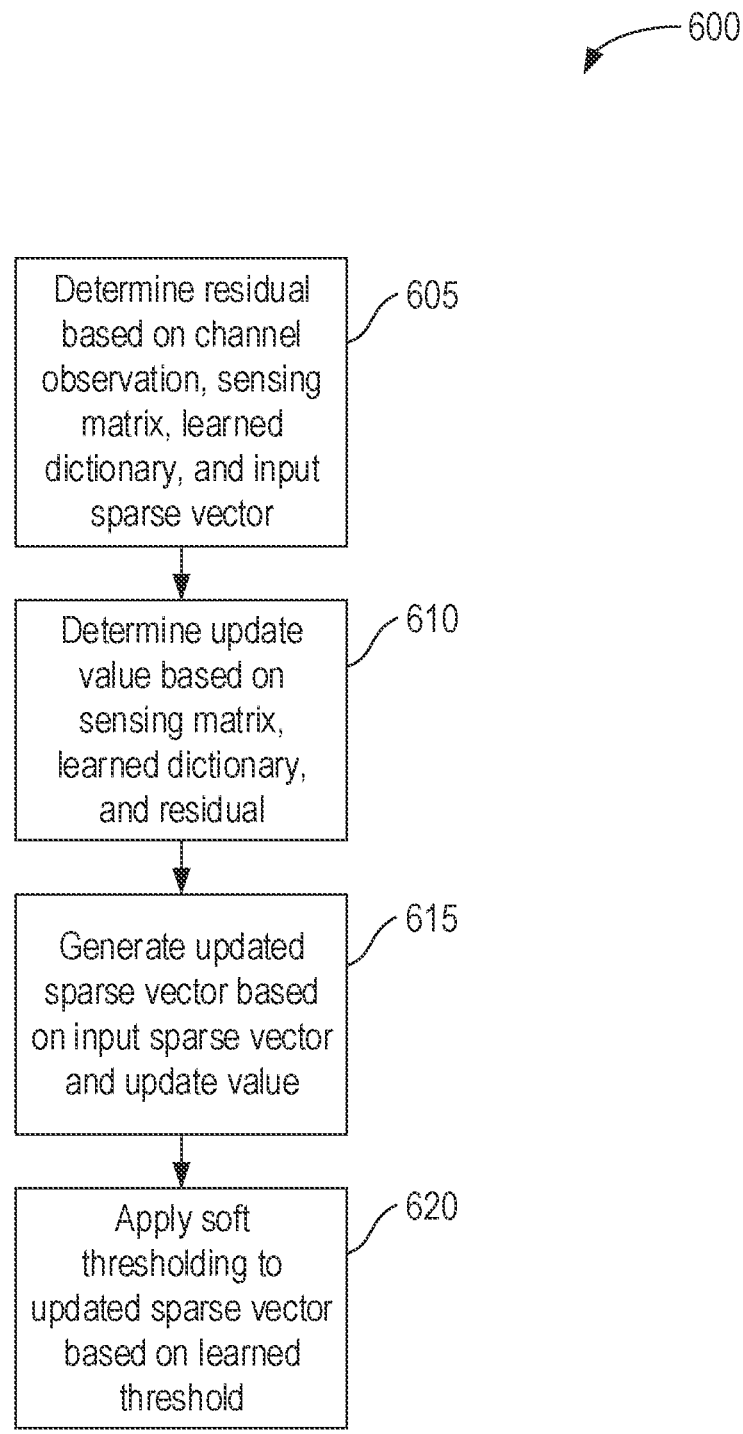
FIG. 6 is a flow diagram depicting an example method for generating sparse vectors using machine learning for improved channel estimation.

Example Method for Sparse Vector Generation Using Machine Learning for Channel Estimation FIG. 6 is a flow diagram depicting an example method 600 for generating sparse vectors using machine learning for improved channel estimation. In some aspects, the method 600 provides additional detail for block 415 of FIG. 4 and/or block 515 of FIG. 5 (where the updated sparse vector representation is generated). Accordingly, the method 600 may be performed by a computing system that corresponds to an offline training system or an online inferencing system.

At block 605, the computing system determines or generates a residual value based on a channel observation y, a corresponding sensing matrix $\Phi$, a learned sparsifying dictionary $\Psi$, and an input sparse vector z. For example, the computing system may use Equation 3, discussed in more detail above, to generate the residual. In some aspects, this residual can then be projected back onto the sparse vector space to evaluate the residual's update (e.g., to determine an update value).

At block 610, the computing system determines or generates an update value based on the sensing matrix, the learned sparsifying dictionary, and the residual value. In some aspects, the computing system can also determine the update value based on a step size, which may be a predefined and fixed value or a learned value. For example, the computing system may use Equation 2, discussed in more detail above, to generate the update value.

At block 615, the computing system generates an updated sparse vector representation based on the input sparse vector representation (which was provided to the layer as input) and the update value. For example, the computing system may use Equation 1, discussed above in more detail, to generate the updated sparse vector.

At block 620, the computing system can then apply a soft thresholding to the updated sparse vector, based on a learned threshold value. For example, as discussed above with reference to Equation 1, the computing system may use a learned threshold value to set some values (e.g., those within a learned threshold distance from zero) to a value of zero.

This updated sparse vector representation can then be provided for downstream processing, such as via input to a subsequent layer of the model. Similarly, if the current layer is the final model layer, the updated sparse vector representation can be used to generate the channel estimation (e.g., by multiplying the sparse vector representation with a learned sparsifying dictionary).

Example Method for Determining Channel Estimations Using Machine Learning

Figure 7:
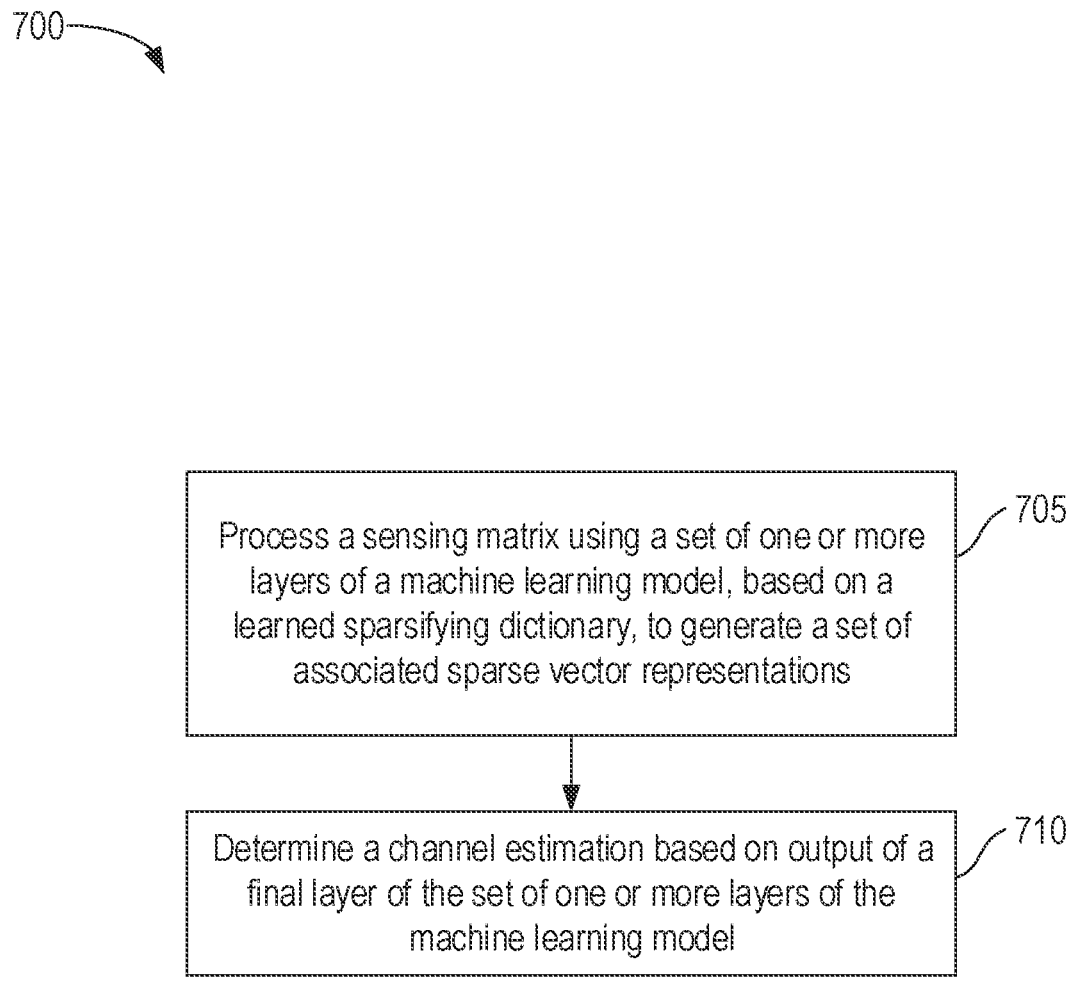
FIG. 7 is a flow diagram depicting an example method for determining channel estimations using machine learning.

FIG. 7 is a flow diagram depicting an example method 700 for determining channel estimations using machine learning. In some aspects, the method 700 is performed by the user equipment participating in the wireless communications. In some aspects, the method 700 can additionally or alternative be performed by the base station participating in the communications.

At block 705, a sensing matrix is processed using a set of one or more layers of the machine learning model, based on a learned sparsifying dictionary, to generate a set of associated sparse vector representations.

At block 710, a channel estimation for a communication channel is determined based on output of a final layer of the set of one or more layers of the machine learning model.

In some aspects, the method 700 further includes refining the learned sparsifying dictionary based on the channel estimation and a ground-truth channel state of the communication channel.

In some aspects, processing the sensing matrix comprises, for each respective layer of the set of one or more layers of the machine learning model, determining a residual value based on a current channel observation, the sensing matrix, the learned sparsifying dictionary, and a previous sparse vector representation, determining an update value based on the residual value, the sensing matrix, the learned sparsifying dictionary, and a step size, and determining a current sparse vector representation based on the previous sparse vector representation and the update value.

In some aspects, determining the residual value (r) for a first layer of the set of one or more layers is performed according to $r = y_i - (\Phi_i \Psi) z_{t-1}$, where $y_i$ is the current channel observation, $\Phi_i$ is the sensing matrix, $\Psi$ is the learned sparsifying dictionary, $z_{t-1}$ is the previous sparse vector representation, t is a layer index for the first layer, and i is an input sample index.

In some aspects, determining the update value (g) is performed according to $g = \gamma (\Phi_i \Psi)^T r$, where $\gamma$ is the step size, $\Phi_i$ is the sensing matrix, $\Psi$ is the learned sparsifying dictionary, r is the residual value, and i is an input sample index.

In some aspects, determining the current sparse vector representation ($z_t$) is performed according to $z_t = \eta_\theta [z_{t-1} + g]$, where g is the update value, $z_{t-1}$ is the previous sparse vector representation, $\eta_\theta$ is a thresholding function, $\theta$ is a learned threshold value, and t is a layer index.

In some aspects, determining the channel estimation ($\hat{h}$) based on the output of the final layer of the set of one or more layers of the machine learning model is performed according to $\hat{h} = \Psi z$, where $\Psi$ is the learned sparsifying dictionary and z is the output of the final layer of the set of one or more layers.

In some aspects, the machine learning model uses a set of learned sparsifying dictionaries, each respective learned sparsifying dictionary of the set of learned sparsifying dictionaries being associated with a respective layer of the set of one or more layers of the machine learning model.

In some aspects, the method 700 further includes receiving a transmitter-side sparsifying dictionary component, and determining the learned sparsifying dictionary based on a receiver-side sparsifying dictionary component and the transmitter-side sparsifying dictionary component.

In some aspects, the machine learning model processes the sensing matrix in an angular domain to generate the set of sparse vector representations using the learned sparsifying dictionary, a learned step size, and a learned threshold.

In some aspects, the channel estimation corresponds to a millimeter wave communication channel.

In some aspects, the method 700 further includes performing one of analog beamforming, beam selection, or spectral efficiency prediction based on the channel estimation.

Example Processing System for Improved Channel Estimation

Figure 8:
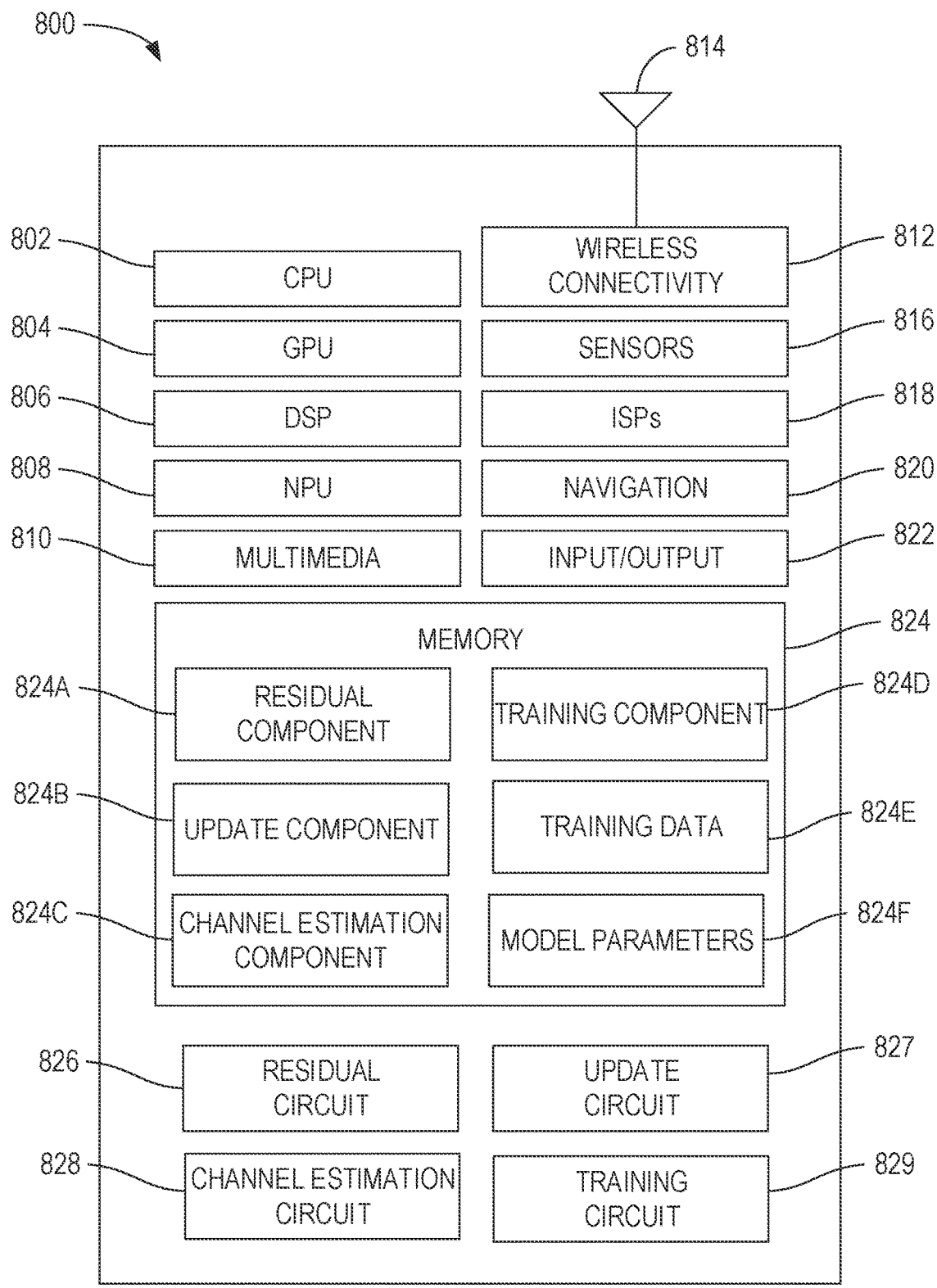
FIG. 8 depicts an example processing system configured to perform various aspects of the present disclosure.

In some aspects, the workflows, techniques, and methods described with reference to FIGS. 1-7 may be implemented on one or more devices or systems. FIG. 8 depicts an example processing system 800 configured to perform various aspects of the present disclosure, including, for example, the techniques and methods described with respect to FIGS. 1-7. In some aspects, the processing system 800 may correspond to a computing system that trains machine learning models (e.g., a training system) and/or to a computing system that uses the trained models for inferencing (e.g., an inferencing system). In some aspects, the processing system 800 corresponds to a base station and/or to user equipment engaged in a wireless communication. Although depicted as a single system for conceptual clarity, in at least some aspects, as discussed above, the operations described below with respect to the processing system 800 may be distributed across any number of devices. For example, a first system may train the model(s) while a second system uses the trained models to generate channel estimations.

Processing system 800 includes a central processing unit (CPU) 802, which in some examples may be a multi-core CPU. Instructions executed at the CPU 802 may be loaded, for example, from a program memory associated with the CPU 802 or may be loaded from a partition of a memory 824.

Processing system 800 also includes additional processing components tailored to specific functions, such as a graphics processing unit (GPU) 804, a digital signal processor (DSP) 806, a neural processing unit (NPU) 808, a multimedia processing unit 810, and a wireless connectivity component 812.

An NPU, such as NPU 808, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as NPU 808, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process the data through an already trained model to generate a model output (e.g., an inference).

In some implementations, NPU 808 is a part of one or more of CPU 802, GPU 804, and/or DSP 806.

In some examples, wireless connectivity component 812 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 812 may be further coupled to one or more antennas 814.

Processing system 800 may also include one or more sensor processing units 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

Processing system 800 may also include one or more input and/or output devices 822, such as screens, touch-sensitive surfaces (including touch-sensitive displays), physical buttons, speakers, microphones, and the like.

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes a residual component 824A, an update component 824B, a channel estimation component 824C, and a training component 824D. The memory 824 also includes a set of training data 824E and model parameters 824F. The model parameters 824F may generally correspond to the parameters of all or a part of a machine learning model trained for channel estimation, such as one or more step sizes, one or more sparsifying dictionaries, and one or more threshold values used for one or more layers of a neural network, as discussed above. The training data 824E generally corresponds to the training samples or exemplars discussed above, such as pairs of channel observations and sensing matrices (along with corresponding ground-truth channel states). The depicted components, and others not depicted, may be configured to perform various aspects of the techniques described herein. Though depicted as discrete components for conceptual clarity in FIG. 8, residual component 824A, update component 824B, channel estimation component 824C, and training component 824D may be collectively or individually implemented in various aspects.

Processing system 800 further comprises residual circuit 826, update circuit 827, channel estimation circuit 828, and training circuit 829. The depicted circuits, and others not depicted, may be configured to perform various aspects of the techniques described herein.

For example, residual component 824A and residual circuit 826 may be used to generate residual values (e.g., using Equation 3 discussed above) as part of one or more layers of a neural network, as discussed above with reference to FIGS. 2-6. Update component 824B and update circuit 827 may be used to generate update values and/or updated sparse vector representations (e.g., using Equations 1 and 2 discussed above) as part of one or more layers of a neural network, as discussed above with reference to FIGS. 2-6. Channel estimation component 824C and channel estimation circuit 828 may be used to orchestrate the processing of data in the network and/or to generate the final channel estimation based on the output sparse vector representation (during training and/or during inferencing), as discussed above with reference to FIGS. 2-6. Training component 824D and training circuit 829 may correspond to the training component 245 of FIG. 2, and may be used to compute losses and/or to refine the machine learning model, as discussed above with reference to FIGS. 2, 4, and 6.

Though depicted as separate components and circuits for clarity in FIG. 8, residual circuit 826, update circuit 827, channel estimation circuit 828, and training circuit 829 may collectively or individually be implemented in other processing devices of processing system 800, such as within CPU 802, GPU 804, DSP 806, NPU 808, and the like.

Generally, processing system 800 and/or components thereof may be configured to perform the methods described herein.

Notably, in other aspects, aspects of processing system 800 may be omitted, such as where processing system 800 is a server computer or the like. For example, multimedia processing unit 810, wireless connectivity component 812, sensor processing units 816, ISPs 818, and/or navigation processor 820 may be omitted in other aspects. Further, aspects of processing system 800 maybe distributed between multiple devices.

EXAMPLE CLAUSES

Implementation examples are described in the following numbered clauses:

Clause 1: A processor-implemented method for performing channel estimation of a communication channel using a machine learning model, comprising: processing a sensing matrix using a set of one or more layers of the machine learning model, based on a learned sparsifying dictionary, to generate a set of associated sparse vector representations; and determining a channel estimation based on output of a final layer of the set of one or more layers of the machine learning model.

Clause 2: A method according to Clause 1, further comprising refining the learned sparsifying dictionary based on the channel estimation and a ground-truth channel state of the communication channel.

Clause 3: A method according to any one of Clauses 1-2, wherein processing the sensing matrix comprises, for each respective layer of the set of one or more layers of the machine learning model: determining a residual value based on a current channel observation, the sensing matrix, the learned sparsifying dictionary, and a previous sparse vector representation; determining an update value based on the residual value, the sensing matrix, the learned sparsifying dictionary, and a step size; and determining a current sparse vector representation based on the previous sparse vector representation and the update value.

Clause 4: A method according to any one of Clauses 1-3, wherein: determining the residual value (r) for a first layer of the set of one or more layers is performed according to $r=y_i-(\Phi_i\Psi)z_{t-1}$, $y_i$ is the current channel observation, $\Phi_i$ is the sensing matrix, $\Psi$ is the learned sparsifying dictionary, $z_{t-1}$ is the previous sparse vector representation, t is a layer index for the first layer, and i is an input sample index.

Clause 5: A method according to any one of Clauses 1-4, wherein: determining the update value (g) is performed according to $g=\gamma(\Phi_i\Psi)^T r$, $\gamma$ is the step size, $\Phi_i$ is the sensing matrix, $\Psi$ is the learned sparsifying dictionary, r is the residual value, and i is an input sample index.

Clause 6: A method according to any one of Clauses 1-5, wherein: determining the current sparse vector representation ($z_t$) is performed according to $z_t=\eta_\theta[z_{t-1}+g]$, g is the update value, $z_{t-1}$ is the previous sparse vector representation, $\eta_\theta$ is thresholding function, wherein $\theta$ is a learned threshold value, and t is a layer index.

Clause 7: A method according to any one of Clauses 1-6, wherein: determining the channel estimation (ĥ) based on the output of the final layer of the set of one or more layers of the machine learning model is performed according to $\hat{h}=\Psi z$, $\Psi$ is the learned sparsifying dictionary, z is the output of the final layer of the set of one or more layers.

Clause 8: A method according to any one of Clauses 1-7, wherein the machine learning model uses a set of learned sparsifying dictionaries, each respective learned sparsifying dictionary of the set of learned sparsifying dictionaries being associated with a respective layer of the set of one or more layers of the machine learning model.

Clause 9: A method according to any one of Clauses 1-8, further comprising: receiving a transmitter-side sparsifying dictionary component; and determining the learned sparsifying dictionary based on a receiver-side sparsifying dictionary component and the transmitter-side sparsifying dictionary component.

Clause 10: A method according to any one of Clauses 1-9, wherein: the machine learning model processes the sensing matrix in an angular domain to generate the set of sparse vector representations based on the learned sparsifying dictionary, a learned step size, and a learned threshold.

Clause 11: A method according to any one of Clauses 1-10, wherein the channel estimation corresponds to a millimeter wave communication channel.

Clause 12: A method according to any one of Clauses 1-11, further comprising performing one of analog beamforming, beam selection, or spectral efficiency prediction based on the channel estimation.

Clause 13: A processing system, comprising: a memory comprising computer-executable instructions; and one or more processors configured to execute the computer-executable instructions and cause the processing system to perform a method in accordance with any one of Clauses 1-12.

Clause 14: A processing system, comprising means for performing a method in accordance with any one of Clauses 1-12.

Clause 15: A non-transitory computer-readable medium comprising computer-executable instructions that, when executed by one or more processors of a processing system, cause the processing system to perform a method in accordance with any one of Clauses 1-12.

Clause 16: A computer program product embodied on a computer-readable storage medium comprising code for performing a method in accordance with any one of Clauses 1-12.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method for performing channel estimation of a communication channel, by a user equipment or a base station, using a machine learning model, comprising:
   processing a sensing matrix using a set of one or more layers of the machine learning model, based on a learned sparsifying dictionary, to generate a set of associated sparse vector representations; and
   determining a channel estimation based on output of a final layer of the set of one or more layers of the machine learning model.

2. The processor-implemented method of claim 1, wherein processing the sensing matrix comprises, for each respective layer of the set of one or more layers of the machine learning model:
   determining a residual value based on a current channel observation, the sensing matrix, the learned sparsifying dictionary, and a previous sparse vector representation;
   determining an update value based on the residual value, the sensing matrix, the learned sparsifying dictionary, and a step size; and
   determining a current sparse vector representation based on the previous sparse vector representation and the update value.

3. The processor-implemented method of claim 2, wherein:
   determining the residual value (r) for a first layer of the set of one or more layers is performed according to $r=y_i-(\Phi_i\Psi)z_{t-1}$,
   $y_i$ is the current channel observation,
   $\Phi_i$ is the sensing matrix,
   $\Psi$ is the learned sparsifying dictionary,
   $z_{t-1}$ is the previous sparse vector representation,
   t is a layer index for the first layer, and
   i is an input sample index.

4. The processor-implemented method of claim 2, wherein:
   determining the update value (g) is performed according to $g=\gamma(\Phi_i\Psi)^T r$,
   $\gamma$ is the step size,
   $\Phi_i$ is the sensing matrix,
   $\Psi$ is the learned sparsifying dictionary,
   r is the residual value, and
   i is an input sample index.

5. The processor-implemented method of claim 2, wherein:
   determining the current sparse vector representation ($z_t$) is performed according to $z_t=\eta_\theta[z_{t-1}+g]$,
   g is the update value,
   $z_{t-1}$ is the previous sparse vector representation,
   $\eta_\theta$ is a thresholding function,
   $\theta$ is a learned threshold value, and
   t is a layer index.

6. The processor-implemented method of claim 1, wherein:
   determining the channel estimation ($\hat{h}$) based on the output of the final layer of the set of one or more layers of the machine learning model is performed according to $\hat{h}=\Psi z$,
   $\Psi$ is the learned sparsifying dictionary, and
   z is the output of the final layer of the set of one or more layers.

7. The processor-implemented method of claim 1, wherein the machine learning model uses a set of learned sparsifying dictionaries, each respective learned sparsifying dictionary of the set of learned sparsifying dictionaries being associated with a respective layer of the set of one or more layers of the machine learning model.

8. The processor-implemented method of claim 1, further comprising:
   receiving a transmitter-side sparsifying dictionary component; and
   determining the learned sparsifying dictionary based on a receiver-side sparsifying dictionary component and the transmitter-side sparsifying dictionary component.

9. The processor-implemented method of claim 1, wherein the machine learning model processes the sensing matrix in an angular domain to generate the set of sparse vector representations using the learned sparsifying dictionary, a learned step size, and a learned threshold.

10. The processor-implemented method of claim 1, wherein the communication channel comprises a millimeter wave communication channel.

11. The processor-implemented method of claim 1, further comprising performing one of analog beamforming, beam selection, or spectral efficiency prediction based on the channel estimation.

12. A processor-implemented method for training a machine learning model for channel estimation of a communication channel by a user equipment or a base station, comprising:
   processing a sensing matrix using a set of one or more layers of the machine learning model, based on a learned sparsifying dictionary, to generate a set of associated sparse vector representations;
   determining a channel estimation based on output of a final layer of the set of one or more layers of the machine learning model; and
   refining the learned sparsifying dictionary based on the channel estimation and a ground-truth channel state of the communication channel.

13. The processor-implemented method of claim 12, wherein processing the sensing matrix comprises, for each respective layer of the set of one or more layers of the machine learning model:

determining a residual value based on a current channel observation, the sensing matrix, the learned sparsifying dictionary, and a previous sparse vector representation;

determining an update value based on the residual value, the sensing matrix, the learned sparsifying dictionary, and a step size; and determining a current sparse vector representation based on the previous sparse vector representation and the update value.

14. The processor-implemented method of claim 13, wherein:

determining the residual value (r) for a first layer of the set of one or more layers is performed according to $r = y_i - (\Phi_i \Psi) z_{t-1}$, $y_i$ is the current channel observation, $\Phi_i$ is the sensing matrix, $\Psi$ is the learned sparsifying dictionary, $z_{t-1}$ is the previous sparse vector representation, t is a layer index for the first layer, and i is an input sample index.

15. The processor-implemented method of claim 13, wherein:

determining the update value (g) is performed according to $g = \gamma (\Phi_i \Psi)^T r$, $\gamma$ is the step size, $\Phi_i$ is the sensing matrix, $\Psi$ is the learned sparsifying dictionary, r is the residual value, and i is an input sample index.

16. The processor-implemented method of claim 13, wherein:

determining the current sparse vector representation ($z_t$) is performed according to $z_t = \eta_\theta[z_{t-1} + g]$, g is the update value, $z_{t-1}$ is the previous sparse vector representation, $\eta_\theta$ is thresholding function, $\theta$ is a learned threshold value, and t is a layer index.

17. The processor-implemented method of claim 12, wherein:

determining the channel estimation ($\hat{h}$) based on the output of the final layer of the set of one or more layers of the machine learning model is performed according to $\hat{h} = \Psi z$, $\Psi$ is the learned sparsifying dictionary, and z is the output of the final layer of the set of one or more layers.

18. The processor-implemented method of claim 12, wherein the machine learning model uses a set of learned sparsifying dictionaries, each respective learned sparsifying dictionary of the set of learned sparsifying dictionaries being associated with a respective layer of the set of one or more layers of the machine learning model.

19. The processor-implemented method of claim 12, further comprising:

receiving a transmitter-side sparsifying dictionary component; and determining the learned sparsifying dictionary based on a receiver-side sparsifying dictionary component and the transmitter-side sparsifying dictionary component.

20. The processor-implemented method of claim 12, wherein:

the machine learning model processes the sensing matrix in an angular domain to generate the set of sparse vector representations using the learned sparsifying dictionary, a learned step size, and a learned threshold.

21. The processor-implemented method of claim 12, wherein the communication channel comprises a millimeter wave communication channel.

22. A non-transitory computer-readable medium comprising computer-executable instructions that, when executed by one or more processors of a processing system, cause the processing system to perform an operation for performing channel estimation of a communication channel using a machine learning model, the operation comprising:

processing a sensing matrix using a set of one or more layers of a machine learning model, based on a learned sparsifying dictionary, to generate a set of associated sparse vector representations; and determining a channel estimation based on output of a final layer of the set of one or more layers of the machine learning model.

23. The non-transitory computer-readable medium of claim 22, wherein processing the sensing matrix comprises, for each respective layer of the set of one or more layers of the machine learning model:

determining a residual value based on a current channel observation, the sensing matrix, the learned sparsifying dictionary, and a previous sparse vector representation;

determining an update value based on the residual value, the sensing matrix, the learned sparsifying dictionary, and a step size; and determining a current sparse vector representation based on the previous sparse vector representation and the update value.

24. The non-transitory computer-readable medium of claim 23, wherein:

determining the residual value (r) for a first layer of the set of one or more layers is performed according to $r = y_i - (\Phi_i \Psi) z_{t-1}$, $y_i$ is the current channel observation, $\Phi_i$ is the sensing matrix, $\Psi$ is the learned sparsifying dictionary, $z_{t-1}$ is the previous sparse vector representation, t is a layer index of the first layer, and i is an input sample index.

25. The non-transitory computer-readable medium of claim 23, wherein:

determining the update value (g) is performed according to $g = \gamma (\Phi_i \Psi)^T r$, $\gamma$ is the step size, $\Phi_i$ is the sensing matrix, $\Psi$ is the learned sparsifying dictionary, r is the residual value, and i is an input sample index.

26. The non-transitory computer-readable medium of claim 23, wherein:

determining the current sparse vector representation ($z_t$) is performed according to $z_t = \eta_\theta[z_{t-1} + g]$, g is the update value, $z_{t-1}$ is the previous sparse vector representation, $\eta_\theta$ is thresholding function, $\theta$ is a learned threshold value, and t is a layer index.

27. The non-transitory computer-readable medium of claim 22, wherein:

determining the channel estimation ($\hat{h}$) based on the output of the final layer of the set of one or more layers of the machine learning model is performed according to $\hat{h} = \Psi z$, $\Psi$ is the learned sparsifying dictionary, and z is the output of the final layer of the set of one or more layers.

28. The non-transitory computer-readable medium of claim 22, wherein the machine learning model uses a set of learned sparsifying dictionaries, each respective learned sparsifying dictionary of the set of learned sparsifying dictionaries being associated with a respective layer of the set of one or more layers of the machine learning model.

29. The non-transitory computer-readable medium of claim 22, the operation further comprising:
receiving a transmitter-side sparsifying dictionary component; and
determining the learned sparsifying dictionary based on a receiver-side sparsifying dictionary component and the transmitter-side dictionary component.

30. A processing system, comprising:
means for processing a sensing matrix using a set of one or more layers of a machine learning model, based on a learned sparsifying dictionary, to generate a set of associated sparse vector representations; and
means for determining a channel estimation based on output of a final layer of the set of one or more layers of the machine learning model.

* * * * *